US007627315B2

(12) United States Patent
Koch et al.

(10) Patent No.: US 7,627,315 B2
(45) Date of Patent: Dec. 1, 2009

(54) TELECOMMUNICATIONS METHOD AND SUITABLE SYSTEM FOR ESTABLISHING A CONNECTION WITH A MOBILE DEVICE

(75) Inventors: Michael Koch, Hinterkappelen (CH); Werner Hirzel, Niederscherli (CH); Martin Meier, Bern (CH); Anton Niklaus Stadelmann, Bolligen (CH)

(73) Assignee: Swisscom Mobile AG, Bern (CH)

( * ) Notice: Subject to any disclaimer, the term of this patent is extended or adjusted under 35 U.S.C. 154(b) by 318 days.

(21) Appl. No.: 11/566,694

(22) Filed: Dec. 5, 2006

(65) Prior Publication Data

US 2007/0099595 A1     May 3, 2007

Related U.S. Application Data

(63) Continuation of application No. 09/744,677, filed as application No. PCT/CH98/00510 on Dec. 2, 1998, now Pat. No. 7,164,927.

(30) Foreign Application Priority Data

Jul. 27, 1998  (CH) .................................. 1585/98

(51) Int. Cl.
  *G06F 15/16*   (2006.01)
(52) U.S. Cl. ....................... 455/433; 455/405
(58) Field of Classification Search ................. 455/405, 455/466, 408, 445, 433
See application file for complete search history.

(56) References Cited

U.S. PATENT DOCUMENTS

| 5,131,020 | A | 7/1992 | Liebesny et al. |
| 5,384,824 | A | 1/1995 | Alvesalo |
| 5,771,455 | A | 6/1998 | Kennedy et al. |
| 5,815,560 | A | 9/1998 | Kasai et al. |
| 5,825,863 | A | 10/1998 | Walker |
| 5,898,766 | A | 4/1999 | Gottesman |
| 5,915,226 | A | 6/1999 | Martineau |
| 5,966,653 | A | 10/1999 | Joensuu et al. |
| 6,009,330 | A | 12/1999 | Kennedy et al. |

(Continued)

FOREIGN PATENT DOCUMENTS

EP     0827119     9/2000

(Continued)

*Primary Examiner*—Sam Bhattacharya
(74) *Attorney, Agent, or Firm*—Oblon, Spivak, McClelland, Maier & Neustadt, L.L.P.

(57) ABSTRACT

Telecommunications method, and system suitable therefor, for establishing a connection with a mobile device, for example a GSM mobile radio telephone, of a participant, who is located in a VPLMN, the calling mobile participant in the VPLMN preparing and sending a short message, for example a USSD message, with the desired destination number, which will be passed on to a callback computer, which establishes a connection between the calling mobile participant and the desired destination number, and a connection being established with a called mobile participant in a VPLMN by a callback computer, whose number is assigned to this called mobile participant in the home location register.

Before the establishment of a connection, checking, in a prepaid module connected to the callback computer, the remaining credit and the remaining airtime of the mobile participant with reference to stored prepaid amounts, or respectively with the aid of at least one tariff table and on the basis of an indication of location of this participant stored in the HLR of the HPLMN.

20 Claims, 2 Drawing Sheets

U.S. PATENT DOCUMENTS

| | | | |
|---|---|---|---|
| 6,052,597 A | 4/2000 | Ekstrom | |
| 6,075,982 A * | 6/2000 | Donovan et al. | 455/406 |
| 6,230,020 B1 | 5/2001 | Kantola et al. | |
| 6,375,073 B1 | 4/2002 | Aebi et al. | |
| 6,631,140 B1 | 10/2003 | Sjodin | |

FOREIGN PATENT DOCUMENTS

| | | |
|---|---|---|
| WO | WO 97/29609 | 1/1997 |
| WO | WO 97/40616 | 4/1997 |
| WO | WO 97/50237 | 6/1997 |
| WO | WO 97/19548 | 11/1997 |

* cited by examiner

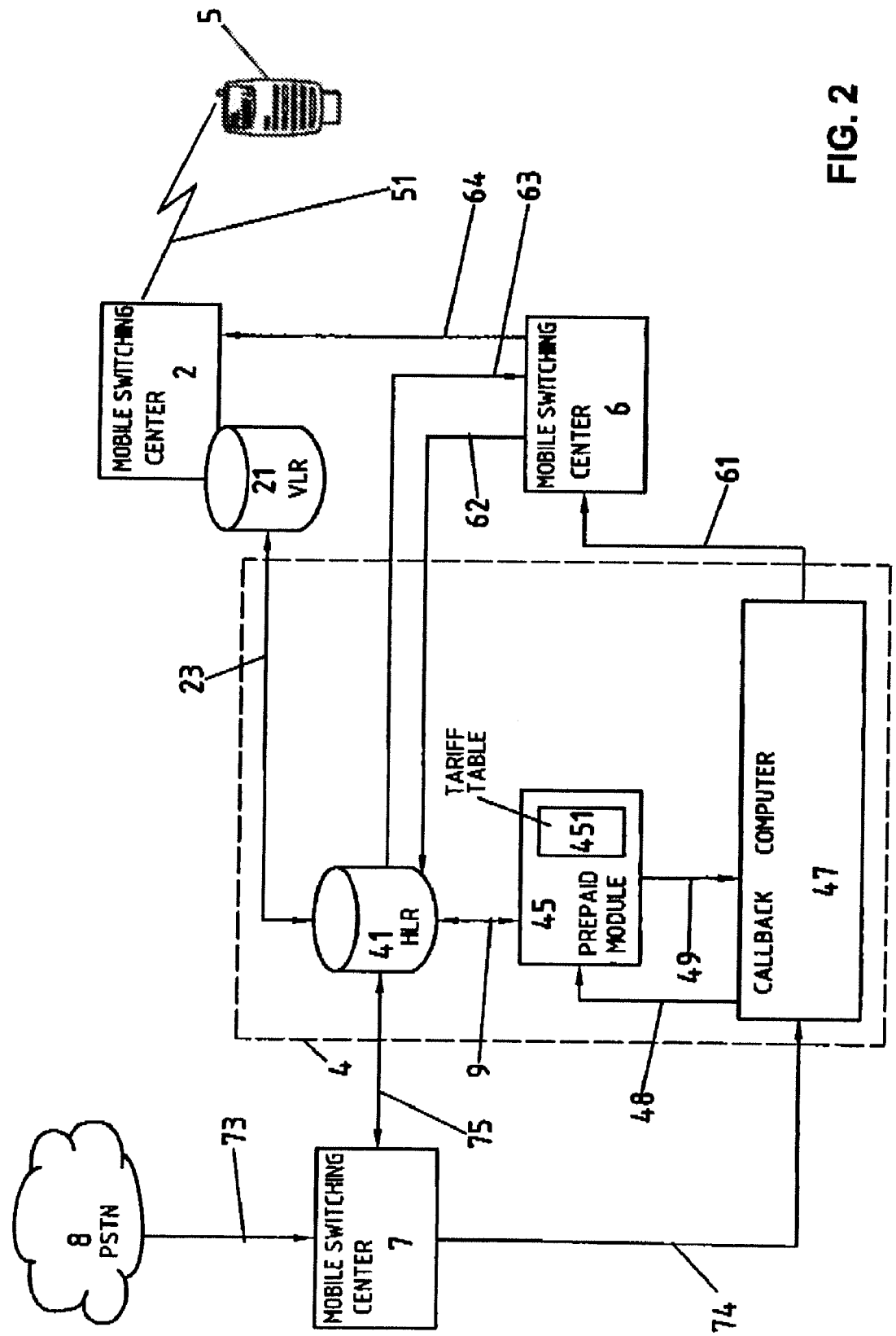

TELECOMMUNICATIONS METHOD AND SUITABLE SYSTEM FOR ESTABLISHING A CONNECTION WITH A MOBILE DEVICE

CROSS-REFERENCE TO RELATED APPLICATION

The present application is a continuation of U.S. application Ser. No. 09/744,677 filed Jan. 29, 2001, which is a national stage of PCT/CH98/00510, filed Dec. 2, 1998, which in turns claims priority to Switzerland 1585/98 filed on Jul. 27, 1998, the entire contents of each of which are hereby incorporated herein by reference.

This invention relates to a telecommunications method and a suitable system for establishing a connection with a mobile device. In particular, it relates to a telecommunications method, and a system suitable therefor, for establishing a connection with a mobile device of a participant who is located in a visited PLMN (Public Land Mobile Network), for example in a foreign VPLMN.

To calculate the costs of a telephone connection, whether for a telephone call or for data transmission, so-called call data records (CDRs) are typically sent to a billing system. The calculated costs, which are dependent upon different parameters such as point in time, duration, place or distance, are charged to the respective participant by the billing system. In a method with prepayment, the costs are deducted from a prepaid amount, whereas in a method with subsequent payment (postpaid), the costs are collected from the respective participant through invoice. In particular in a GSM mobile radio network, the call data records typically arrive for billing at the billing system only after a time lag. In the case of call data records from abroad, this time lag can very well be even longer. For prepaid systems, this time lag can be problematic because it is thereby possible for a participant to phone free of charge during this time lag when actually his prepaid credit has already run out. Solutions in which the credit of a participant is tracked directly and in real time, for example on his SIM card inserted into the mobile device, are considered too insecure by many operators because they believe that such cards are susceptible to fraudulent manipulations. In general, the problem is circumvented by the network operators in that outgoing calls (originating calls) of a mobile participant who is stationed in a VPLMN, for example a foreign PLMN, are blocked, for example in the HLR of the HPLMN of the mobile participant. For the affected mobile participant, this solution is understandably unsatisfactory.

Described in the patent application WO 97/29609 is a method for establishing a voice link between a subscriber to a mobile radio network and a partner on the voice channel of a mobile terminal, in which method data necessary for setting up the call are transmitted over an additional data channel accessible to the terminal, in particular the SMS (Short Message Services) channel. According to the method described in WO 97/29609, the call is set up via a monitoring computer connected to the terminal, which computer automatically dials a call number obtained via the data channel or transmits a data message to a remote station for initiation of a voice link by this remote station.

Described in the patent application WO 97/50237 is a method and a system for validating a forward-to-number within a mobile telecommunications system. According to the method described in WO 97/50237, a forwarding request is transmitted to a mobile switching center (MSC) by means of a USSD (Unstructured Supplementary Services Data) message, which mobile switching center, through a call back to the mobile station and through a call to the telephone terminal associated with the forward-to-number, establishes a voice link between the mobile station and the telephone terminal, so that the mobile subscriber can verbally verify the forward-to-number.

It is the object of this invention to propose a new and better telecommunications method and suitable system which in particular make it possible to establish a connection with a mobile device of a participant who is located in a visited PLMN (VPLMN).

According to the present invention, this object is achieved in particular through the elements of the characterizing portion of the independent claims. Further preferred embodiments follow moreover from the dependent claims and from the specification. In the present invention the object is additionally achieved of establishing a prepaid connection with a mobile participant in a VPLMN.

In particular, these objects are achieved through the invention in that a calling mobile participant in a VPLMN prepares and sends a short message with the desired destination number for a participant to be called, which destination number is passed on to a callback computer, which establishes a connection between the mobile device of the calling participant and the desired destination number.

A connection with the mobile device of a called mobile participant in a VPLMN is preferably established by a callback computer, the number of this callback computer being assigned to this called mobile participant in the home location register.

According to the invention, before establishment of a connection, the remaining credit of the mobile participant in the VPLMN is checked in a prepaid module connected to the callback computer, and the connection is established only if this credit suffices. This credit check of the mobile participant can be carried out independently of whether the call of the mobile participant in the VPLMN is outgoing (originating call) or whether this mobile participant is being called in the VPLMN (terminating call).

Said prepaid module preferably calculates the remaining sending time (airtime) of the mobile participant with the aid of at least one tariff table, and passes it on to the callback computer.

Said prepaid module preferably calculates the remaining sending time (airtime) of the mobile participant on the basis of a location indication for this participant stored in a database, this database preferably being the home location register (HLR) of the home PLMN (HPLMN) of the mobile participant and the location indication preferably being the VLR address of this participant.

In an embodiment variant, the connection of the callback computer is truncated if the remaining credit of the mobile participant has run out.

In an embodiment variant, said mobile device is a GSM device, e.g. a GSM mobile radio telephone, and said short message is a USSD message.

In an embodiment variant, prepaid amounts for at least certain mobile participants can be stored in the prepaid module.

Different configurations for visited PLMN and home PLMN can preferably be stored in the home location register for at least certain participants.

The prepaid module can preferably be connected to the home location register via a MAP protocol, which MAP protocol can take over the contents of a short message sent to a home location register, for example a USSD message, and can pass it on together with the call number and location indication, stored in this home location register, for the participant who has sent the short message.

In a variant embodiment, the MAP interface accesses the home location register by means of the MAP protocol via the signalling system number 7 (SS7).

An embodiment of the present invention will be described in the following with reference to an example. The example embodiment is illustrated by the following attached figures:

FIG. 2 shows a schematic data flow diagram, which illustrates the data flow upon connection establishment between a called mobile device and a calling participant in the public switched telephone network (PSTN).

Figure 1:
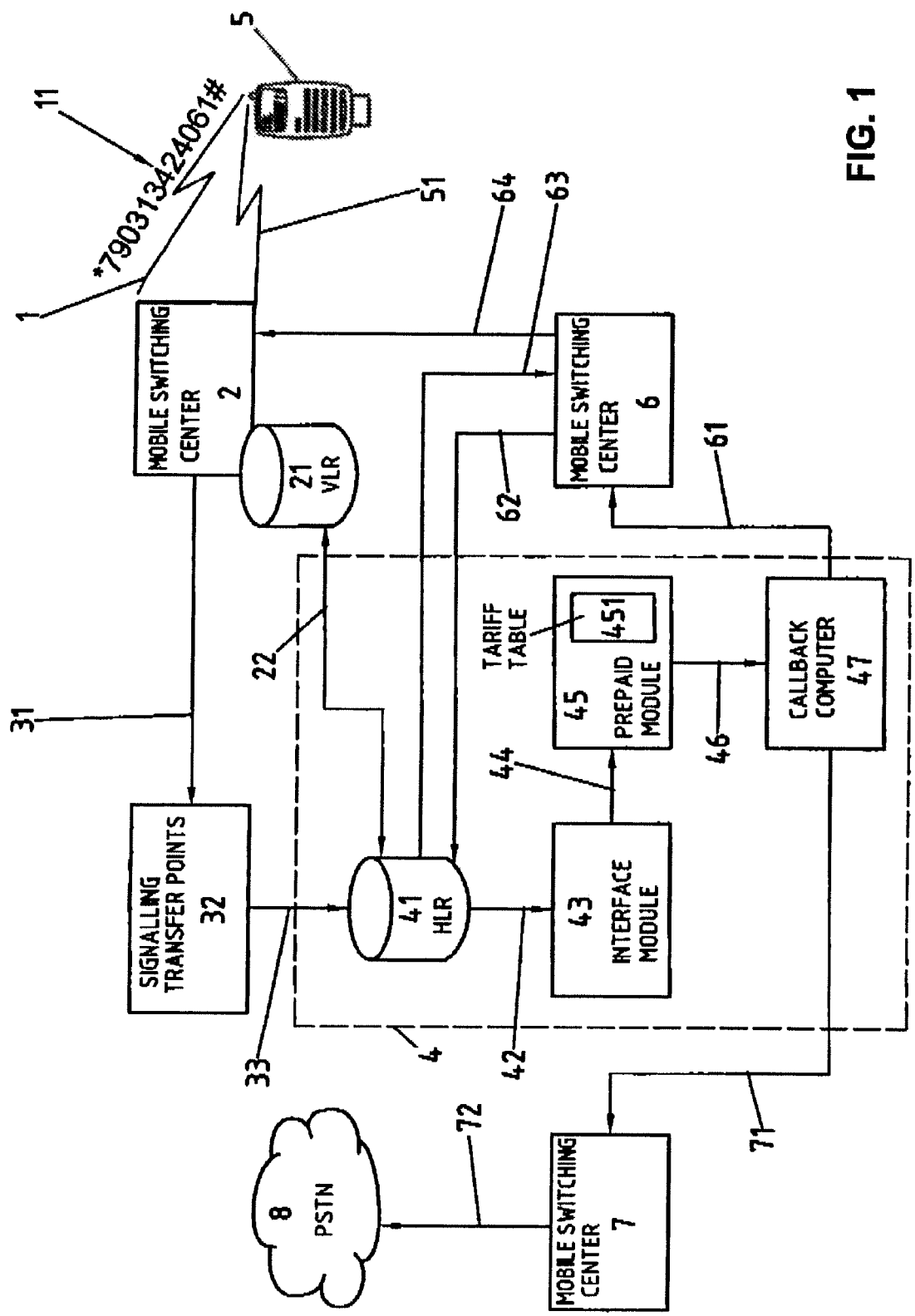
FIG. 1 shows a schematic data flow diagram, which illustrates the data flow upon connection establishment between a mobile device and a participant in the public switched telephone network (PSTN).

The reference numeral 5 in FIG. 1 refers to a mobile device, in particular a mobile radio telephone 5, for example a mobile radio telephone of the GSM or UMTS type or another type. The connection designated by the reference numeral 1 illustrates schematically the transmission of a short message 11 from the mobile device 5 to a switching center 2 for mobile radio communication, a so-called mobile switching center 2 (MSC). In particular, the short message designated by the reference numeral 11 shows an example of a destination number, which is transmitted to the mobile switching center 2 in a USSD short message 11 prepared by the user of the mobile device 5, i.e. by the mobile participant. As shown in this example, the short message 11, here a USSD short message 11, can be drafted in such a way that it has a one or more digit prefix, for example a three digit prefix, which is used for identification of a special service. This prefix can be entered, for example, by a calling participant via the input means of the mobile device 5, or it can be automatically added by the mobile device 5. In the latter case, this can be carried out, for example, by a program intended therefor on a SIM card removably connected to the mobile device 5, it being possible for this program to be started by the calling participant, for example, by means of a special key of the mobile device 5. In another variant, the program can also be automatically started on the SIM card if it is detected that the calling participant is located in a VPLMN for which all outgoing calls are blocked, and if these facts are communicated to the SIM card. After the prefix, the short message 11 can contain further information corresponding to the special service, in our example the destination number of the participant whom the calling participant would like to call with his mobile device 5. The destination number can, for example, be entered by the calling participant by digit-wise input or by pressing one or more speed dial keys (pre-programmed call numbers). In the case of a USSD message 11, the participant can draft and send the entire short message 11, for example, through entry of the symbol *, of the prefix, of the destination number, and of the symbol #. In another variant, the above-mentioned program on the SIM card can be started, which program requests the entry of the destination number by the calling participant (digit-wise or by means of speed dial keys), and the complete short message 11, here a USSD message, with the prefix and the destination number, can be drafted and sent.

Assuming that the calling (mobile) participant is not located in the territory of his home public land mobile network (HPLMN), but in a visited public land mobile network (VPLMN), the MSC 2 that receives the short message 11 sent by the calling participant will identify this calling participant, for example by means of callback to the home location register 41 (HLR) of the HPLMN of the calling participant according to the GSM standard, and pass on the short message 11, for example a USSD short message 11, as indicated by the arrows 31 and 33, all the way to the HLR 41 of the HPLMN of the calling participant, for example via signalling transfer points (STP) 32.

The reference numeral 43 designates an interface module, which is based on the mobile application part (MAP) protocol, and can access the home location register 41 by means of this MAP protocol via the signalling system number 7 (SS7). From this interface module 43, which we also refer to as the MAP interface in the following, the destination number packed in the USSD short message 11, the call number of the calling participant who drafted and sent the short message 11, i.e. his mobile subscriber ISDN number (MSISDN), as well as a location indication for this participant, is <sic. are> passed on from the HLR 41 to a prepaid (roaming) module 45, as indicated by the arrows 42 and 44. The location indication can be a VLR address stored in the HLR 41, for example, i.e. the number of the visitor location register 21 (VLR) at the MSC 2 in whose territory the calling participant is located. In a variant, the location indication can be a more precise indication, which can be queried by the HLR 41 from the VLR 21 of the calling participant.

For one skilled in the art, there are different variants for achieving the HLR 41, the MAP interface 43 and the prepaid module 45 as software programs on a common computer or on separate computers, for example commercially available servers. The functions of the standard HLR 41 in the HPLMN of the calling participant are additionally extended in such a way that different configurations can be stored for VPLMNs, e.g. a foreign PLMN, and HPLMNs. These configurations can be stored as different participant profiles, for example, which can be distinguished through different prefixes.

The prepaid module 45, a software module implemented in a server by one skilled in the art, checks the credit of the calling participant identified by means of the MSISDN. The stored prepaid amount of the respective participant required therefor is collected by a prepaid billing system (PPB) (not shown), for example, which is implemented together with the prepaid module 45 on a common computer or on a separate computer connected, for example, via TCP-IP. In another variant, the stored prepaid amounts are stored directly in the prepaid module 45. On the basis of the calculated credit of the calling participant and with the aid of at least one stored tariff table 451, the prepaid module 45, i.e. the corresponding software program, calculates the remaining sending time (airtime), taking into consideration the location indication for the calling participant, for example the VLR address. As indicated by the arrow 46, the prepaid module 45 passes on the destination number, the call number of the calling participant, i.e. his MSISDN, and the remaining sending time (airtime) to a callback computer 47.

The callback computer 47 is preferably a commercially available callback computer, which, by means of a call back to the calling participant, can establish a connection between him and the participant called by him. The callback computer 47 can be connected to the prepaid module 45 via TCP/IP, for example, or one skilled in the art can decide to implement the prepaid module 45 directly on the callback computer 47. One skilled in the art will understand that, depending upon embodiment variant, the interface to the callback computer 47 as well as some functions of the callback computer 47 will have to be adapted. For example, if the decision is made in the callback computer 47 as to whether the remaining sending time (airtime) of the calling participant, calculated by the prepaid module 47, suffices to establish a connection, for example through a comparison with a predefined value, a corresponding function must be added if it is not available in the standard callback computer on the market. In a variant this decision can also be left to the calling participant in that the remaining sending time (airtime) is transmitted to him, and is displayed, for example, on the display of the mobile device 5, or is reproduced acoustically, and requested from him is the entry of an answer by means of the operating elements of the mobile device 5. The transmission can take place, for example, by means of short messages, for example SMS or USSD short messages, or by means of interactive voice response (IVR). In another embodiment variant, however, this decision can already be made in the prepaid module 45.

If it is decided that a connection should be established, this takes place typically as follows. The callback computer 47 checks the destination number and supplements the call number of the calling participant with a prefix in order to show, as explained above, that involved is a participant in a VPLMN. In a variant, the MSISDN is passed on to the callback computer 47 directly with this prefix by, the prepaid module 45. Then, as shown by the arrow 62, a standard call is established via a MSC 6. As shown by the arrow 62, the MSC queries the temporary roaming number in the HLR 41, after which it is recognized in the HLR 41, based on the prefix, that involved is a participant who is stationed in a VPLMN, for example abroad. As indicated by the arrow 63, the temporary roaming number is transmitted to the MSC 6, and the call to the calling participant in the VPLMN is established by the MSC 6 via the MSC 2, as indicated by the arrows 64 and 51. Depending upon the embodiment variant and/or the way of functioning of the respective callback computer 47, simultaneously with the call to the called participant or immediately after the calling participant has accepted the incoming call, the destination number is called by the callback computer 47 via MSC 7 and via the public switched telephone network 8 (PSTN), as indicated by the arrows 71 and 72. The connection between the calling participant in the VPLMN and the destination number in the PSTN 8 is thereby established as soon as the participant reached via the destination number accepts the call.

After termination of the connection, for example after end of the conversation or end of the data transmission, the corresponding call data are transmitted by the callback computer 47 to the prepaid module 45. In a variant, the callback computer can interrupt the connection, for example together with a corresponding IVR warning to both participants, if the remaining sending time (airtime) of the calling participant has run out. On the basis of the call data received, the prepaid module 45 will debit the amount used The new credit balance on the SIM card is updated to the calling participant by means of SMS or USSD short messages; in a variant this is possibly not done until a later point in time when the respective participant is located again in the HPLMN.

It should be mentioned here that, in another embodiment variant of the method described above, the connection is established without credit check and airtime calculation. This last variant is preferred in a postpaid variant of the connection establishment in which the WAP interface 43 described is directly connected to the callback computer 47 and transmits the destination number and the MSISDN thereto, possibly with prefix. After end of the connection, the call data are passed on by the callback computer 47 to a billing system (not shown) for billing.

So far, with reference to FIG. 1, the handling of a call from a mobile participant out of a VPLMN, for example from abroad, has been dealt with (originating call). To be described in the following, with reference to FIG. 2, is the handling of a call to a mobile participant in a VPLMN, for example abroad (terminating call).

The call by a participant in a public switched telephone network (PSTN) 8 to a called mobile participant is established via a MSC 7, as shown by the arrow 73. The MSC 7 queries the routing information in the HLR 41, as shown by arrow 75. Owing to the differing participant profile, described above, for a participant who is stationed in a VPLMN, for example abroad, the fix number of the callback computer 47 is transmitted to the querying MSC 7 by the HLR 41 instead of the roaming number. The call is thus passed on by the MSC 7 directly to the callback computer 47, as indicated by arrow 73. As shown by the arrow 48, the callback computer 47 supplies the call number of the called participant, i.e. his MSISDN number to the prepaid module 45. As indicated by the arrow 9, the prepaid module 45, with the MSISDN of the called participant, queries his corresponding location indication in the HLR 41, for example the VLR address. This query takes place, for example, by means of the MAP protocol. In a variant, the location indication can be a more precise indication which can be queried by the HLR 41 from the VLR 21 of the calling participant. In a further variant, the location indication is already transmitted by the HLR 41 with the query by the MSC 7 together with the fix number of the callback computer 47, shown by the arrow 75.

The prepaid module 45 checks the credit of the called participant identified by means of the MSISDN. The stored prepaid amount required therefor of the respective participant is collected, for example, by a prepaid billing system (PPB) (not shown) which is implemented together with the prepaid module 45 on a common computer or on a separate computer, however connected via TCP-IP, for example. In another variant, the stored prepaid amounts are stored directly in the prepaid module 45. The credit of the called participant in the VPLMN is calculated because this participant has to assume the costs for the connection outside his HPLMN. The costs for this connection portion are usually not charged to the calling participant since he is not informed about the whereabouts of this called participant and cannot know that he has initiated a call in a VPLMN, for example abroad. On the basis of the calculated credit of the called participant and with the aid of at least one stored tariff table 451, the prepaid module 45, i.e. the corresponding software program, calculates the remaining sending time (airtime), taking into consideration the indication of location of the called participant, for example the VLR address. As indicated by the arrow 49, the prepaid module 45 passes on the remaining sending time (airtime) to the callback computer 47.

As mentioned above, the callback computer 47 is preferably a commercially available callback computer, which is connected to the prepaid module 45, for example via TCP/IP. One skilled in the art will understand that, depending upon the variant embodiment, the interface to the callback computer 47 as well as some functions of the callback computer 47 have to be adapted. The decision as to whether the remaining sending time (airtime) of the called participant calculated by the prepaid module 45 suffices to establish a connection, for example through comparison with a predefined value, can be made in the callback computer 47 or in the prepaid module 45, for example, and has to be added as corresponding function in the callback computer 47 if it is not available in a standard way in the commercially available callback computer. In a variant, this decision can also be left to the participant in that the remaining sending time (airtime) is transmitted to him, and is displayed, for example, on the display of the mobile device 5, or is reproduced acoustically, and requested from him is the entry of an answer by means of the operating elements of the mobile device 5. As explained above, the transmission can take place, for example, by means of short messages, for example SMS or USSD short messages, or by means of interactive voice response (IVR).

If it is decided that a connection should be established, this typically takes place as was described above for the connection establishment by the callback computer 47 via the MSC 6 and 2.

After termination of the connection, the corresponding call data are again transmitted by the callback computer 47 to the prepaid module 45 for debiting of the amount used. In this example too, in a variant, the callback computer can interrupt the connection, for example together with a IVR warning to both participants, if the remaining sending time (airtime) of the called participant has run out. The new credit balance of the SIM is updated to the called participant by means of SMS or USSD short messages. In a variant this is possibly not done until a later point in time when the respective participant is again located in the HPLMN.

In this example too, in a variant embodiment, the connection can be established without credit check and airtime calculation, this last variant being preferred in a postpaid variant of the connection establishment in which the callback computer 47 establishes the connection directly after receipt of the MSISDN of the called participant from the MSC 7, possibly with prefix, and transmits the call data after end of the connection to a billing system (not shown) for billing.

It is to be mentioned in general that, in both examples described, more callback computers 47 could be available in principle, which can also be installed abroad, for example.

The proposed method and the system suitable therefor are useful above all for network operators, who have concluded roaming agreements with other network operators, for example in other countries, and who want to offer their customers a solution which makes it possible for them, also from a VPLMN, to hold conversations using their mobile devices or transfer data, and who possibly would also like to use prepaid services therefor. Network operators who have at their disposal the proposed system for carrying out the proposed method can offer their customers in addition the described prepaid and/or postpaid services, also alternatively, in certain or all VPLMNs with which they have concluded a roaming agreement, for example in that they correspondingly configure the respective customer in the HLR. The network operators can furthermore offer the interested mobile participants the described method in a corresponding variant as an additional connection establishment possibility in their HPLMN.

Besides the sale of entire systems, it can also be interesting to market system components separately, for example data carriers with programs stored thereon for control of computers, for example commercially available servers, according to the method described: for example, a data carrier with a program for implementation of a HLR 41 with the corresponding adaptations according to the proposed method and/or with a program for implementation of the described MAP interface 43, and/or with a program for implementation of the prepaid module 45, and/or with a program for control of the described callback computer 47.

The advantages of USSD messages for execution of the described method should also be mentioned here. Since the USSD messages are transmitted as signalling data, they are transmitted very efficiently, i.e. fast, and usually free of charge. As was already mentioned above, the USSD messages are moreover not disabled even when outgoing calls and/or SMS messages are blocked. Moreover it is much easier for participants to enter a USSD message in their mobile device than, for example, a SMS short message.

As was already mentioned above, the USSD message 11 can be drafted in such a way that it has a prefix which is used for identification of a special service, and that after the prefix, corresponding to the special service, further information follow, for example the destination number described above of the participant whom a calling participant would like to call with his mobile device 5. A further example of a such a special service is loading or reloading a data carrier card with a monetary amount value.

Described in the published patent application EP 827 119 A1 is a method for loading and reloading a data carrier card with a monetary amount value. According to the method described in EP 827 119 A1, the sales value of a value card available at a great many points of sale is reloaded or loaded onto a particular data carrier card, in particular a SIM card, after a code located on this value card has been transmitted to a service center. This code is located under a covering and can be exposed by scratching away the covering layer. After calling a particular service number, the code is typed into the mobile radio telephone under the guidance of a speech server of this service center, and is transmitted to this service center. The identification code of the participant is also transmitted thereby, either automatically from the SIM card of the participant, or likewise by typing in under the guidance of the speech server. Mentioned as an alternative in EP 827 119 A1 is that a short message according to the GSM standard can be used instead of the input of the data by means of the service number. In the service center, the transmitted code of the value card is checked in a database in which all codes and the associated monetary amount values for which value cards have been made out at any one time are stored. If a typed-in and transmitted code is found in the database, a GSM short message is prepared containing the identification code of the participant and the monetary amount value, and is filed in a short message service center. In the database the code of the value card with the associated monetary amount value is marked as used or is cancelled. If the data carrier card, for example the SIM card, is inserted in a communications device and a connection is established with the communications network, the data carrier card to be loaded or reloaded is loaded or reloaded with the monetary amount value by means of the prepared GSM short message.

As was already mentioned above, such a method for loading or reloading a data carrier card with a monetary amount value can be initiated as a further special service by means of a USSD message which can be more easily entered by the participant than, for example, a SMS short message, and can be transmitted via the signalling, usually free of charge. In concrete terms that means that a special prefix indicates this special loading or reloading service and that the information relating to this service following the prefix comprises the code of the value card, which is typed in, for example, by the respective participant by means of input means of his mobile device 5. As shown in FIG. 1, for example, the thus prepared USSD message, together with the identification of the participant who has sent the USSD message, can be transmitted from the mobile device of the participant, via a HLR 41, and, as indicated by arrows 42 and 44, via a MAP interface 43, to a service center 45, from where the reloading or loading of the SIM card, inserted into the mobile device 5, with the monetary amount value corresponding to the value card can be carried out as in the method that was described in EP 827 119 A1.

The invention claimed is:

1. A telecommunications method for establishing a connection between a mobile device of a participant and a destination number, comprising:

in a first step, sending from the mobile device to a callback computer, the destination number and information which requests a call from the mobile device to the destination number in order to establish said connection between said mobile device and said destination number; and in a second step, establishing said connection by the callback computer between said mobile device of the participant and said destination number, wherein the second step includes:
checking a remaining credit of said participant,
calling said mobile device by said callback computer, and
calling said destination number by said callback computer, thereby establishing said connection between said mobile device and said destination number, after said checking of the remaining credit, and
calculating a remaining airtime with the aid of at least one tariff table.

2. The telecommunications method according to claim 1, wherein:
a prepaid module connected to said callback computer calculates said remaining airtime.

3. The telecommunications method according to claim 2, wherein:
said prepaid module transmits the remaining airtime to said callback computer.

4. The telecommunications method according to claim 3, wherein said prepaid module calculates said remaining airtime on the basis of an indication of location of said participant stored in a database.

5. The telecommunications method according to claim 4, wherein said database is a home location register of a home public land mobile network of said participant and the indication of location is a visitor location register address of said participant.

6. The telecommunications method according to claim 1, wherein said connection is truncated by said callback computer if the remaining credit of said participant has run out.

7. The telecommunications method according to claim 2, wherein:
said prepaid module is configured to communicate with a SIM card.

8. The telecommunications method according to claim 7, wherein:
said SIM card is configured to communicate with said prepaid module via a SMS short message.

9. The telecommunications method according to claim 7, wherein:
said SIM card is configured to communicate with said prepaid module via an unstructured supplementary services data message.

10. A system for establishing a connection between a mobile device of a participant and destination number, the system comprising:
a callback computer configured to establish said connection between said mobile device of said participant and the destination number by at least calling said mobile device after the participant transmits said destination number and information which requests a call from the mobile device to the destination number in order to establish said connection between said participant and said destination number,
wherein said callback computer is configured to call said destination number thereby establishing said connection after checking if remaining airtime is sufficient to establish said connection, and the remaining airtime is calculated with the aid of at least one tariff table.

11. The system according to claim 10, wherein:
a prepaid module is connected to said callback computer.

12. The system according to claim 11, wherein:
said prepaid module is configured to communicate with a SIM card.

13. The system according to claim 12, wherein:
said SIM card is configured to communicate with said prepaid module via a SMS short message.

14. The system according to claim 12, wherein:
said SIM card is configured to communicate with said prepaid module via an unstructured supplementary services data message.

15. A computer readable storage medium for establishing a connection between a mobile device of a participant and a destination number, said computer readable storage medium configured to store program instructions for execution on the mobile device enabling the mobile device to perform the steps of:
in a first step, sending from said mobile device to a callback computer, a destination number and information which requests a call from the mobile device to the destination number in order to establish a connection between said mobile device and said destination number; and
in a second step, loading or reloading said computer readable storage medium with a monetary value, wherein the second step includes:
said mobile device transmitting a code located on said computer readable storage medium to a service center,
if said computer readable storage medium is inserted in said mobile device and a connection is made with a communications network,
loading or reloading said computer readable storage medium with said monetary value by a short message, a prefix in said short message indicating whether said computer readable storage medium is to be loaded or reloaded, and
saving said monetary value in said computer readable storage medium.

16. The computer readable storage medium of claim 15, wherein:
said mobile device is a GSM device.

17. The computer readable storage medium of claim 15, wherein:
said computer readable storage medium is configured to communicate with said callback computer.

18. The computer readable storage medium of claim 17, wherein:
said computer readable storage medium is a SIM card.

19. The computer readable storage medium of claim 18, wherein:
said SIM card is configured to provide a SMS short message.

20. The computer readable storage medium of claim 18, wherein:
said SIM card is configured to provide a unstructured supplementary services data message.

* * * * *